United States Patent [19]
Bobard

[11] 3,828,871
[45] Aug. 13, 1974

[54] TRACTOR-SET RESULTING FROM THE COUPLING OF A TRACTOR TO A STRADDLE TRACTOR, ABLE TO BE DRIVEN BY A SINGLE DRIVER

[76] Inventor: Emile Bobard, 17, Rue de Reon, Beaune, France

[22] Filed: May 25, 1972

[21] Appl. No.: 256,951

[30] Foreign Application Priority Data
May 27, 1971 France .............................. 71.19405
Dec. 10, 1971 France .............................. 71.44578
Dec. 13, 1971 France .............................. 71.44769
Dec. 20, 1971 France .............................. 71.45813

[52] U.S. Cl. ............. 180/1 F, 180/14 D, 180/77 R, 301/37 N, 280/415 R, 280/402, 280/419
[51] Int. Cl. ........................................... B62d 49/00
[58] Field of Search ............. 180/1 F, 14 R, 12, 11, 180/77 R; 301/37 N; 280/402

[56] References Cited
UNITED STATES PATENTS
1,267,742   5/1918   Bulley ............................... 180/14 D
1,310,604   7/1919   Burgess ............................. 180/14 R
2,551,231   5/1951   Anderson ....................... 180/14 R X
3,119,630   1/1964   Oliver .............................. 180/14 R X
3,170,715   2/1965   Johnson ........................... 180/14 X FOREIGN PATENTS OR APPLICATIONS
93,073   12/1968   France ............................... 180/1 F

*Primary Examiner*—Kenneth H. Betts

[57] ABSTRACT

The disclosure of the present invention is a set resulting from the coupling of two tractors each comprising a frame equipped with an engine, driving and steering means, and each carried by four wheels of which two at least are drive wheels and two at least are steerable wheels. One of the two tractors is a relatively low and narrow tractor which is covered by a straddle tractor sufficiently high and wide for such covering. Means are provided to ensure the driving and steering of this set from a single driving post.

8 Claims, 12 Drawing Figures

TRACTOR-SET RESULTING FROM THE COUPLING OF A TRACTOR TO A STRADDLE TRACTOR, ABLE TO BE DRIVEN BY A SINGLE DRIVER

The invention concerns a tractor-set resulting from the coupling of two tractors of which one at least is of the straddle type.

It concerns more particularly the means for coupling these two tractors to each other, and the control means particular to the engine of one of the tractors to permit the driving of the set by a single driver.

At present, tractors with a relatively high power situated within the range of 50 or 75 HP up to 100 or even 150 HP are being used more and more, due to the speed they ensure for the execution of very large tasks, generally called "heavy labour." Nevertheless, numerous "light" tasks still remain, even in the largest agricultural exploitations and because of this, these very powerful tractors have a relatively small total profitability. In addition, their conditions of mass production, of average quantity, create high cost prices which are unfavorable for this profitability.

The basic object of the present invention is to overcome this major drawback concerning profitability.

The invention intends more particularly to put forward a set of two tractors of average power, the traction power of this set obviously being approximately equal to the arithmetical sum of the power of these two tractors.

Another object of the invention is to propose a compact set of two tractors occupying a space on the ground similar to that of the two tractors which occupy a larger space from the point of view of ease of driving this set.

Another object of the invention is to put forward a set of two tractors intended to be driven and steered by a single driver.

Another object of the invention is to propose robust coupling means which are inexpensive and which may be attached for a negligible cost price to the frames of the two tractors.

Another object of the invention is to propose means permitting the operations of coupling and uncoupling of the two tractors, practically as easy and rapid as the usual operations for attaching a vehicle or an implement to a tractor and for detaching it therefrom.

According to the invention, such a set results from the coupling, by overlapping, of a relatively low and narrow tractor to a tractor of the straddle type, sufficiently high and sufficiently wide to permit such overlapping, with means being provided to harmonize the operation of the engines of said tractors from a single driving post.

Other characteristics and advantages of the invention will become apparent from the following description taken in connection with the accompanying drawings, which description and drawings are given only by way of non-limitative example.

In the drawings,

FIG. 7 is a view, from the rear, of the two tractors of the set on irregular ground and is shown on the sheet illustrating FIG. 1;

Figure 1:
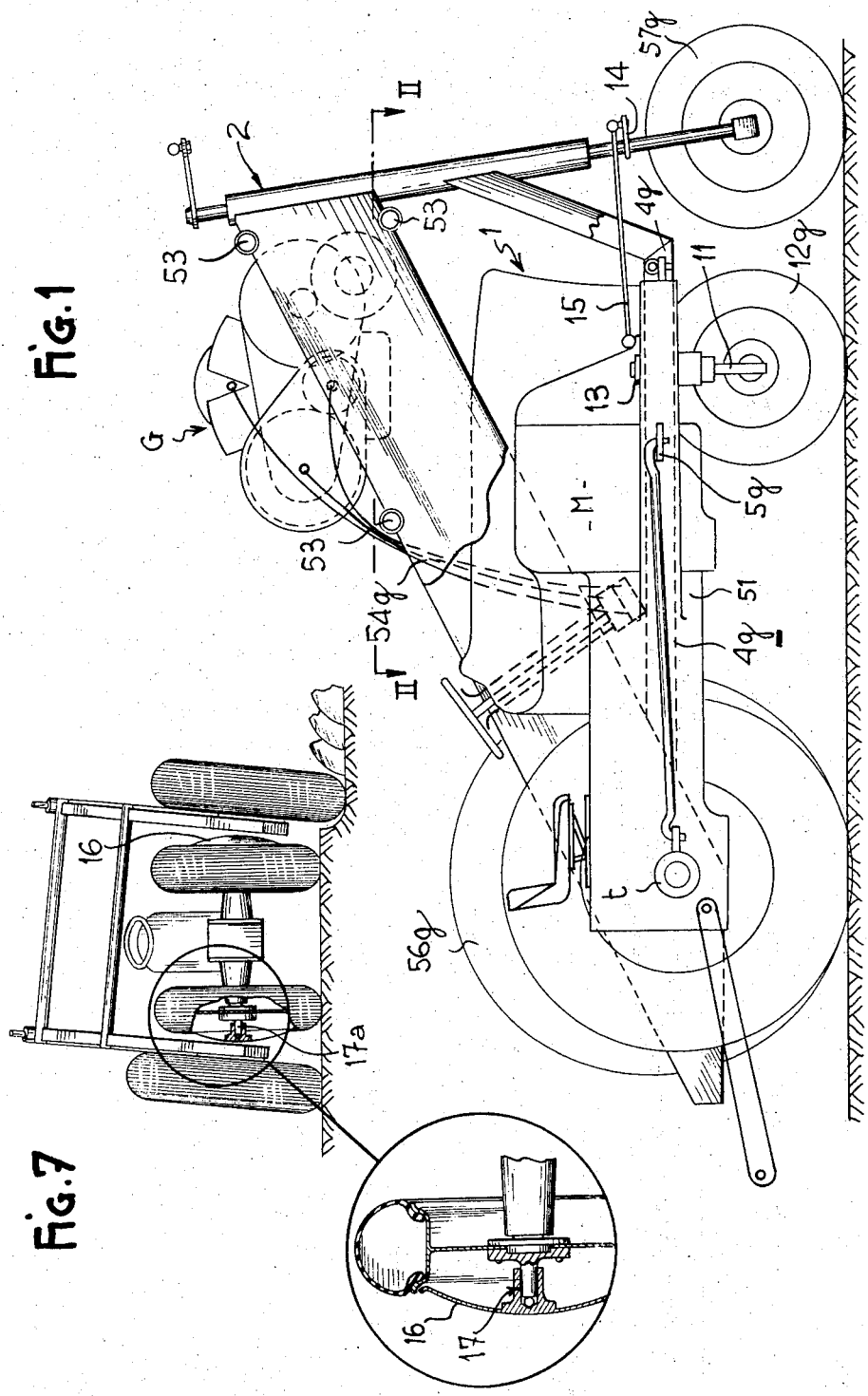
FIG. 1 shows in elevation a tractor of conventional structure, housed inside and coupled to a straddle tractor, the right side-frame of the latter being cut away along the line 1—1 of FIG. 2.

Reference numerals indicated in the following description will refer to corresponding parts throughout the disclosure and drawings; some of the parts are illustrated in pairs, and the subscript letters "d" and "g" will be used to indicate the right or left side of the tractor on which these parts are situated.

Figure 2:
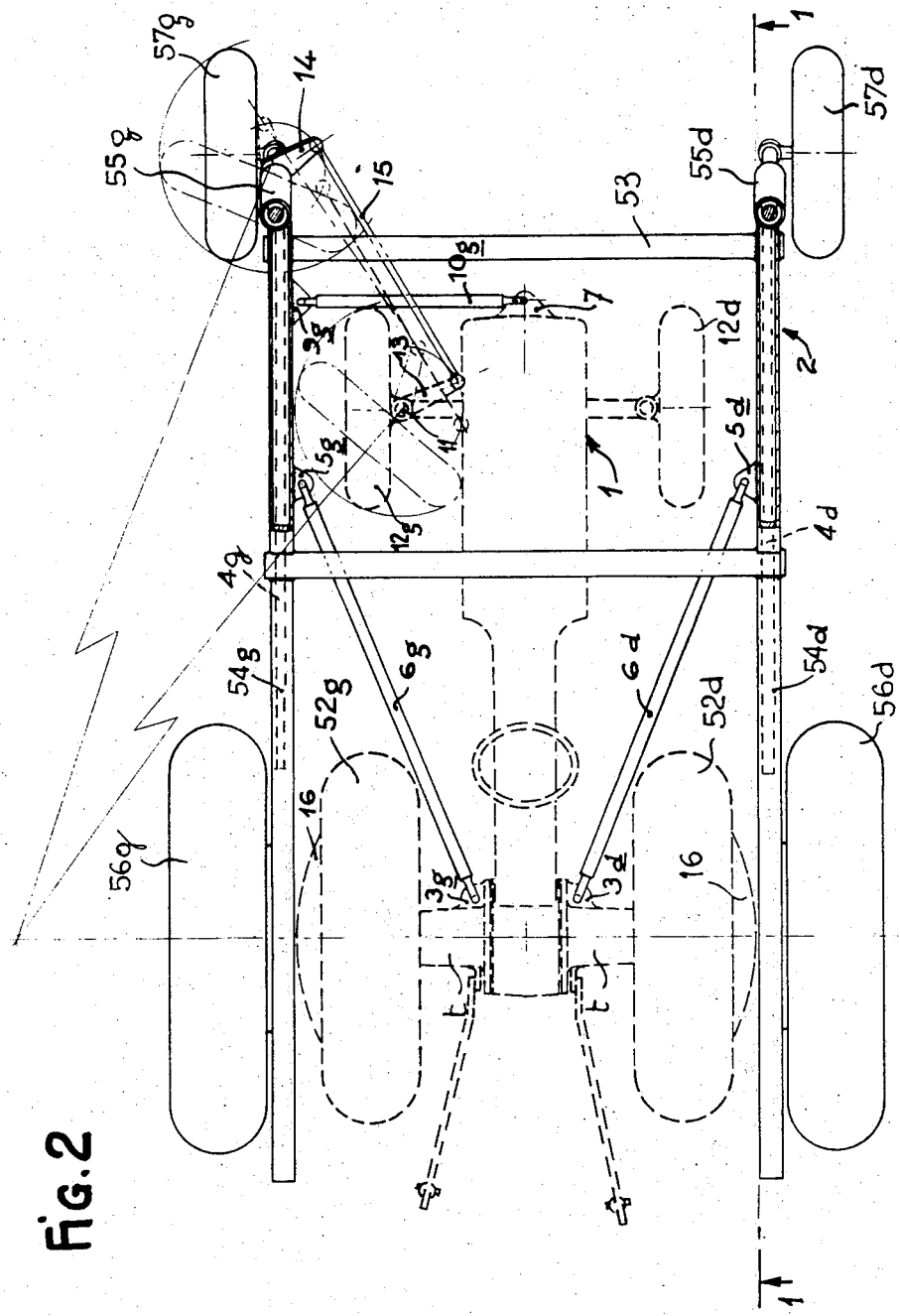
FIG. 2 shows, in plan view, the set which results from the coupling of the two tractors of FIG. 1, the upper part of the straddle tractor being cut away along the line 11—11 of FIG. 1.

In FIGS. 1 and 2 may be seen a tractor 1 and another tractor 2, coupled to each other, as will be explained hereinafter, to form a set.

The tractor 1 has a frame 51 of the tubular type, forming a composite longitudinal girder which is carried, at its front, thanks to a conventional suspension system having a false axle, by two steerable wheels $12d$ and $12g$ and, at its rear, by two drive wheels $52g$, $52d$. These wheels $52d$, $52g$ are mounted, in a usual manner, on the respective ends of two transverse half-shafts (not visible in the figures); these shafts are conventionally housed and mounted in tubular elements "$t$," perpendicular to the general direction of frame 51 and rigid with the latter.

A traditional engine "M" is secured on the front of frame 51 and conventional devices and mechanisms (not visible in the figures) are arranged inside this frame 51 and on the latter, in order to ensure conventional transmission from this engine to wheels $52d$, $52g$.

Finally, conventional drive means and steering means, a traditional driving post as well as means of attaching loads or implements which generally equip tractor frames of this type are placed on frame 51 and have not been shown, for clarity of the figures.

The tractor 2 has a frame formed of two side-frames, right and left, which are constituted by elements respectively symmetrical with respect to a median vertical plane of this frame and are assembled, at their tops, to the respective ends of cross-members 53.

Each side-frame basically comprises two elements $54d$, $54g$ and $55d$, $55g$, respectively equipped, in a conventional manner, at their bases, with a drive wheel $56d$, $56g$ and a steerable wheel $57d$, $57g$, a profile element $4d$, $4g$ bent upward at its front being rigid at its ends with the bases of these elements 54 and 55.

A conventional engine-gearbox unit "G" is mounted on the top of this frame and is coupled to wheels 56 by conventional means of transmission and of speed-variation applicable to tractors, such as that described in my U.S. Pat. No. 3,625,072 issued Dec. 7, 1971. Conventional driving and steering means, and a traditional driving post, placed in a usual manner on the adequate parts of this frame, have not been shown for clarity of the figures.

It will be noted that the space occupied by the tractor 1 is substantially smaller than the free space formed inside the straddle frame of tractor 2, the geometrical axes of wheels 52, 56 being situated approximately in the same vertical plane. In addition, the frames of the two tractors 1 and 2 have approximately a common longitudinal plane of symmetry.

The frames of these two known tractors 1, 2 of different types have been modified as hereinafter described.

Two elements 3d, 3g, resulting from the suitable cutting out of a rigid steel plate, are respectively welded to parts of the tubular elements "t," these parts being close to frame 51. Elements 3 each have a hole adapted to the free engagement of the end of a curved bar or of a hook to form two attachment tabs. Two other tabs 5d, 5g, similar to tabs 3, are welded respectively to the median parts of the inner faces of longitudinal members 4d, 4g.

Two rigid bars 6d, 6g, similar to each other, have, at their ends, a part suitably bent to form a hook. The two hooks of each bar 6 are engaged respectively in the holes of tabs 3 and 5 which are situated on one and the same side of the symmetry plane common to the two tractor frames, the length of bars 6 being adapted to the relative arrangement of the two tractors 1, 2, mentioned above.

Finally, another tab 7, similar to tabs 5, is welded on the front and median part of tractor 1, while a tab 9 of the same type is welded to the inner face of the front of the longitudinal member 4g. A rigid bar 10 having at each of its ends a hook is mounted between these tabs 7, 9 to complete this arrangement which is practically to the median vertical planes of symmetry of the tractors 1 and 2.

Figure 3:
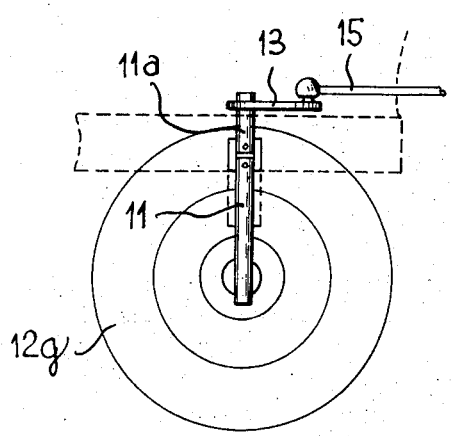
FIG. 3 shows, in elevation, a detail of the front of the conventional tractor of FIG. 1 and is shown on the sheet illustrating FIGS. 8, 9a, 9b and 9c.

Moreover, a rod element 11a (FIG. 3) is fixed coaxially to the upper end of the pivot shaft 11 of the steerable wheel 12g, this fixing being ensured, for example, by a sleeve and a pin. An arm 13 is radially mounted on the free end of rod 11a and the latter is sufficiently long for the arm 13 to be situated at a higher level than the top of said wheel 12g.

The pivot shaft of the wheel 57g is equipped with a radial arm 14 and the ends of a bar 15 are articulated in conventional fashion to the corresponding ends of arms 13 and 14, in such a way that the steering devices of the two tractors 1, 2 are synchronized.

In addition (FIG. 7), a rigid element 16, in the form of a spherical cap, resulting for example from the shaping of a relatively thick steel disc, is rigidly united with a rigid sleeve 17, the latter being situated coaxially to the axis of said cap, on the part of the concave face corresponding to the pole of said cap.

The blind hole of this sleeve 17 is adapted for free engagement with a view to free mounting, on the end of an element forming a spindle 17a which is coaxially fixed to the hub of wheel 52g.

The edge of the cap 16 is close to the rim of this wheel 52g without bearing against said rim and the wheel 52d is equipped with another cap identical to cap 16; the pole common to these two caps is adapted to the distance which is formed transversely between the hubs of wheels 52d, 52g and to the distance from the inner faces of elements 54d, 54g, to reserve a relatively small clearance between said faces and the caps 16. Thus, the two caps are laterally imprisoned between longitudinal members 54d, 54g to ensure correct relative transverse positioning of the four drive wheels of the set (FIG. 7).

Finally, in the case where the two known tractors 1, 2 are equipped with transmission systems comprising a conventional gear-box, at least the means for adjusting the working speed of their engine, the means of transmission to the drive wheels and the means of braking for each tractor may be connected to one and the same driving post for the two tractors. Such post may be mounted in a conventional way on either tractor; the post may be removable, such as that described in my U.S. Pat. No. 3,696,880 issued Oct. 10, 1972.

Preferably, however, whatever may be the particularities of the devices equipping the two tractors 1, 2, the transmission members of the tractors will be advantageously equipped with remote control means which will be arranged to be synchronized on one of the two driving posts of these two tractors.

The foregoing description shows that the set described above may be controlled and steered by a single driver and that the power and adherence to the ground of this set are practically equal to the sum of the power and adherence of each of tractors 1 and 2; implements or trailers may be attached, in conventional fashion, to the attachment means of one and/or the other of these tractors.

During such utilisation, the coupling bars 6d, 6g and 10 ensure good relative disposition of the two tractors, whatever the irregularities of the terrain which may appear (FIG. 7); the clearance of the hooks of bars 6, 10 in the holes of their respective tabs, permits articulation movements adapted to these different positions of one tractor in relation to the other.

It is to be noted, on this subject, that if necessary another bar similar to bar 10 could be provided, symmetrical to the latter, between the front of tractor 1 and the longitudinal member 4d, to offset the tightening and slackening forces which may be caused by the traction or thrust forces of the oblique coupling bars 6.

In addition, during this utilisation, the bar 15 ensures the synchronisation of the orientation movements of the two sets of steering wheels 12, 57 of the two tractors.

Finally, bars 6d, 6g, 10 may easily and rapidly be disengaged from their tabs, the bar 15 may also be disengaged from the articulations of arms 13, 14 and the remote control means may be disconnected from the driving post to which they are connected.

The various drive and steering devices of the driving post of each tractor may then be replaced in their usual state for utilisation and the two tractors may be separated from each other, by displacement of one of them; during this displacement the caps 16 may form guides.

Thus there are obtained two traction units, which are independent from each other, and of average power;

the reverse operations to those just described from the very powerful set described hereinabove.

Figure 4:
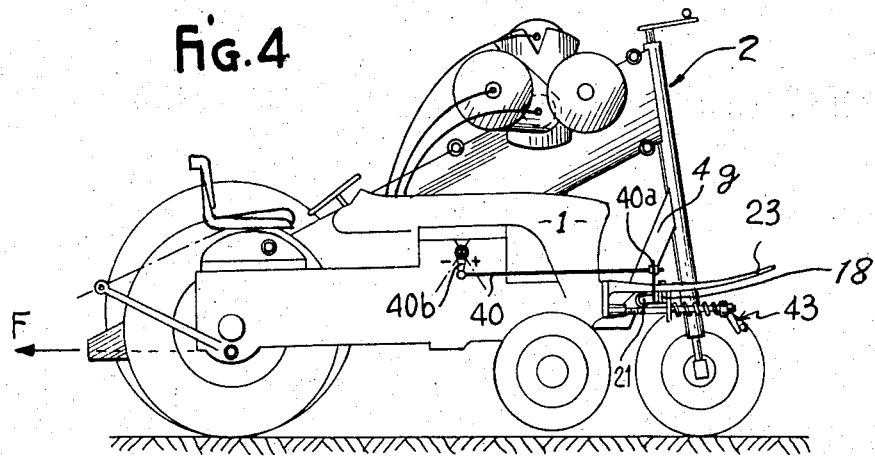
FIGS. 4 and 5 are similar to FIGS. 1 and 2 and concern an alternative form of the means for coupling the two tractors, this alternative form being equipped with means ensuring automatic adjustment of the working speed of the engine of the conventional tractor as a function of the speed of the engine of the straddle tractor.
Figure 5:
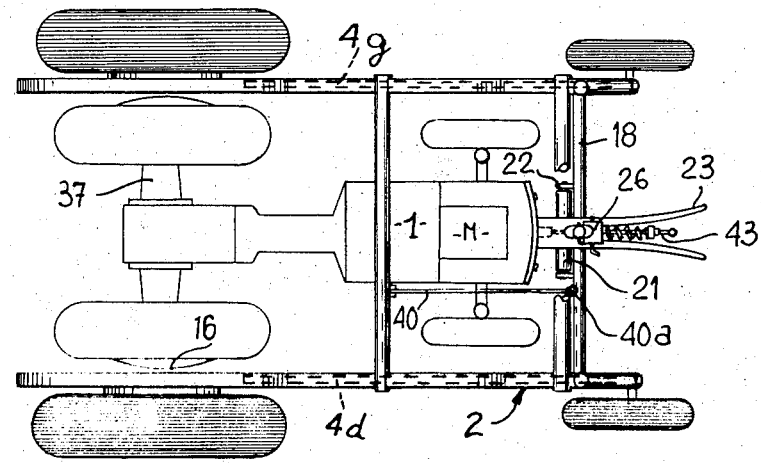
Figure 6A:
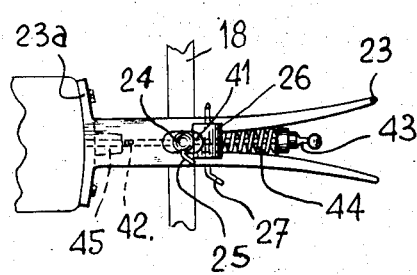
FIGS. 6a and 6b show respectively, on an enlarged scale, in plan view and in elevation, the coupling means of FIGS. 4 and 5.
Figure 6B:
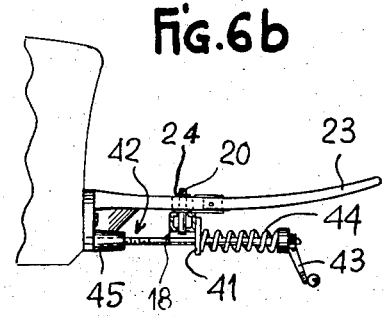

In FIGS. 4 and 5 may be seen two tractors 1, 2, similar to the tractors of FIGS. 1 and 2, and also forming a set; the two drive wheels of tractor 1 are equipped with spherical caps 16.

A rigid tubular element 18 is secured transversely by its ends to the bent part of longitudinal members 4d, 4g of the frame of tractor 2, this fixing being ensured by means of nuts and bolts for example, thanks to holes provided in the elements 4 and 18.

The cross-member 18 thus formed on this frame is situated at a slightly higher level than the usual level of the front part of the frame 51 and an axle 20, equipped with a roller 24 is formed on the upper face of the median part of this cross-member 18.

Two lugs 22 are welded perpendicularly to the lateral rear face of cross-member 18 and on either side of the median part thereof. A roller 21, the length of which, relatively great, corresponds to the spacing of these two lugs 22, is mounted free on an axle suitably secured to said lugs 22.

Moreover, two rigid bars 23, curved (from the rear to the front) upwardly and outwardly, extend practically horizontally, parallel to each other, and are situated on either side of the roller 24 of axle 20. The rear ends of these branches 23 are rigid with each other and with a transverse bar 23a which is adapted for the front and median securing of the fork thus formed on the front of tractor-frame 51.

It will be noted that branches 23 bear against roller 21 which thus supports the load of the front of tractor 1, wheels 12d, 12g being raised from the ground.

An element 26, forming a longitudinal abutment, is engaged between the branches 23, and two conventional locking pegs are respectively engaged in a hole of the upper part of the axle 20 and in transverse holes of branches 23 and of abutment 26 to fasten this fork to cross-member 18, sufficient clearances being reserved between this abutment and the bottom of the fork, as well as between each branch 23 and the roller 24 to permit, on the one hand, various relative positions of the two tractors on irregular ground (FIG. 7), and on the other hand, small slackenings in the longitudinal relative positions of their frames.

A rigid tab 41 is welded to the lateral front face of the median part of cross-member 18, this tab extending downwardly and having at its bottom a hole for the engagement of a rod 42 having a threaded end which is thus situated below said cross-member. The front part of this rod 42 comprises a crank 43 and a round plate for bearing one of the ends of a compression spring 44, engaged on this rod 42, the other end of spring 44 being applied to the front face of tab 41.

A threaded lug 45 is welded to the median portion of the bar 23a which is situated below fork 23, for an engagement by screwing of the threaded end of this rod 42, the screwing permitting to insert, between the two frames of the tractor, spring 44 the opposing force of which (at the beginning of compression) corresponds substantially to the traction force which cross-member 18 of tractor 2 exerts, through spring 44, on tractor 1 when the engine of tractor 2 is manually adjusted at minimum power.

It is in terms of this adjustment of the minimum power of tractor 2, that a rod 40, having one end fixed to a log 40a integral with cross-member 18 and the other end to a lever 40b, maintains in a position of minimum feeding the automatic power-adjustment means of the engine of tractor 1.

The compression displacement of spring 44 resulting from the traction force of tractor 2 (with the engine in full power) corresponds to the displacement of lever 40b of the automatic adjustment means of the engine of tractor 1; it can easily be seen that during the said displacements of this set manually controlled by one only of the two tractors, the spring 44 may be subjected to a reduction in length which is greater as the tractor 2 pulls the tractor 1 with increased power. This reduction displaces forwardly, due to the liaison by the rod 40, the lever 40b in order to increase the power of the engine of tractor 1 until the initial balance of spring 44 is restored.

Obviously the reverse effects would be produced for relative lags of the elements bearing the ends of spring 44 which permit extension of the latter.

In addition, it is enough to unscrew the rod 42 from the lug 45, then the pegs 25, 27 and the abutment 26 and to uncouple the rod 40, to be able to displace tractor 2 forwardly (or tractor 1 rearwardly) and to separate these two tractors. This separation is effected without knocking or bumping, thanks to the curve of branches 23 and to roller 21; there are thus obtained two traction units of average power.

Conversely, during a relative engagement of these two independent units, the fork 23 ensures, thanks to roller 24 of axle 20, automatic centering longitudinally of the two frames of the tractors, this fork and the roller 21 also ensuring the role of a cam causing elevation above the ground of the steerable wheels 12 of tractor 1, to permit steering from the driving post of tractor 2 of the set which is formed after locking of axle 20 into fork 23 and after elastic coupling of the two tractor frames by spring 44.

Figure 8:
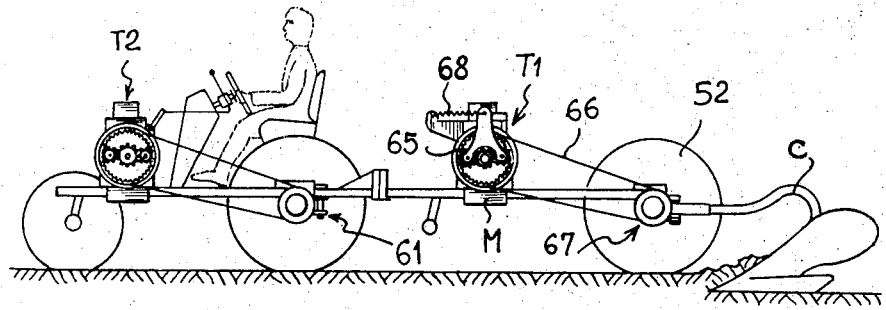
FIG. 8 shows diagrammatically a set of two tractors, respectively equipped with special means of transmissions from their engine to their driving wheels, these transmission means permitting automatic adjustment of the speed of one of the engines.

In FIG. 8 may be seen the diagram of an attachment of two tractors T1–T2, which conforms to the coupling principle described above, coupling between their two frames being ensured, in this case, practically without longitudinal clearance, thanks to a peg and a ring 61, while the steerable wheels of tractor T1 have been dismantled in order to permit driving and steering of this set from the usual driving post of tractor T2, by a single driver while pulling implement c.

Figure 9A:
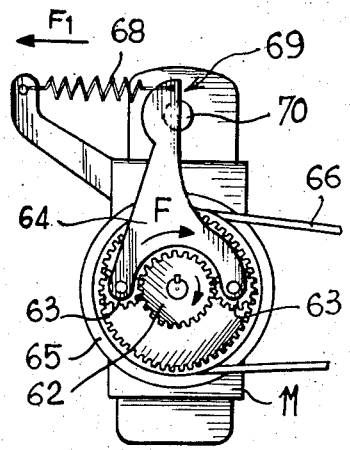
FIGS. 9a to 9c are diagrams explaining the operation of the transmission means of FIG. 8.

The device for transmitting power from the engine M of tractor T1 to wheels 52 comprises a cog-wheel 62 which is cottered on the end of this engine M (FIG. 9a).

In addition, two toothed pinions 63 are arranged diametrically on either side of wheel 62 and are engaged with the latter, these pinions 63 being mounted free on axles rigid with a support 64, to form a set of satellite pinions able to swivel about the shaft of engine M.

A crown 65 has on its inner face teeth which are engaged with those of pinions 63, the outer face of said crown being formed for example in the shape of a pulley groove for a belt 66, which is engaged in addition on another pulley 67, ensuring in a conventional manner, the driving of wheels 52.

A traction spring 68 is hooked by one of its ends to a suitable portion of the support 64 and by the other end to an element rigid with the casing of the engine M. In addition, the support 64 comprises means, shown in diagram form at 69, adapted to adjust the throttle valve (the end of which is shown diagrammaticaly at 70 for supplying the engine M.

When the tractor-set advances and the wheels 52 are not subjected to any driving or slowing forces from the tractor T2, the torque F, which the pinion 62 applies to the support 64, balances the torque F1 which spring 68 applies to this support.

Figure 9B:
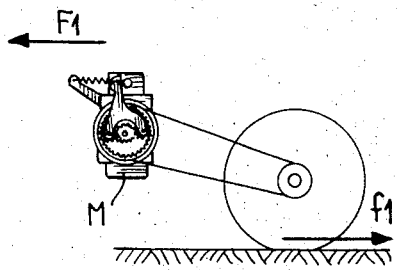

On the other hand (FIG. 9b), when the wheels 52 of tractor T1 are subjected to a driving force (arrow f1) from the tractor T2 which is manually controlled, the driving torque F tends to decrease and, as a result, the action of the spring 68 (arrow F1) causes a displacement of the support 64 to ensure greater supply of the engine M until balance of the above-mentioned torques is restored.

Figure 9C:
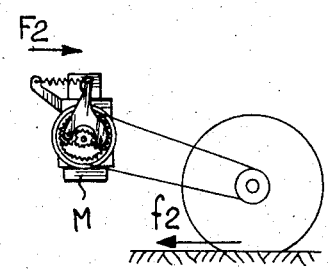

Conversely (FIG. 9c), when the wheels 52 are subjected to braking (arrow f2) from tractor T2, the driving torque F tends to increase, which causes, against the action of spring 68, a displacement (arrow F2) of the support 64 which creates a decrease in the supply of engine M, until balance of the above-mentioned torques is restored.

Obviously such an automatic engine adjustment device of a tractor coupled to a tractor having a manually controlled engine can easily equip one of the tractors of the tractor-sets described above, with reference to FIGS. 1 and 2 or FIGS. 4 and 5, and the attachment of the two tractors of this latter alternative form, by means of the fork 23 and the cross-member 18, may be effected without longitudinal clearance and avoiding the use of the elastic means constituted by the spring 44.

It goes without saying that many changes and substitutions of parts may be made to the specific forms of embodiment hereinbefore described without departing from the spirit and scope of the invention.

What is claimed is:

1. A set resulting from the coupling of two tractors, each tractor including a frame, four wheels of which at least two are drive wheels and two are steerable wheels, an engine, driving and steering means; one of said two tractors being a relatively low and narrow tractor covered by a straddle tractor sufficiently high and wide for such covering; means for coupling the frames of said two tractors ensuring a practically parallel position of the longitudinal median planes of said frames and an arrangement of the axles of said drive wheels practically in one and the same vertical plane; a single drive post mounted on one of said tractor for driving and steering said coupled tractors; and means for controlling the working speed of said two tractor engines.

2. A set as defined in claim 1, wherein said means for coupling the two tractor frames comprise: a support rigid with a cross-member mounted on the front of said straddle tractor and bearing means fixed to the front of said first tractor at a level slightly lower than the level of said support in order to raise from the ground the steerable wheels of said first tractor.

3. A set as defined in claim 2, wherein said cross-member mounted on said straddle tractor comprises transverse guide means for positioning means fixed on the front of the frame of said first tractor.

4. A set as defined in claim 2, wherein said bearing means comprise at least one curved bar bearing against the support of the cross-member and forming a cam for raising above the ground the steerable wheels of said first tractor.

5. A set as defined in claim 1, wherein two at least of the wheels of said first tractor are each equipped with means for contacting the side-members of said straddle tractor.

6. A set as defined in claim 5, wherein said contacting means are in the form of extensions of the axles of the drive wheels of said first tractor, said extensions being rotatable independently of said axles.

7. A set as defined in claim 6, wherein said contacting means comprise a spherical cap, coaxial and rigid with the end of an axle extension.

8. A set as defined in claim 1, wherein said coupling means include longitudinal clearance and elastic means sensitive to a difference in traction force of said two tractors and means sensitive to a variation in the dimension of said elastic means and adapted to an adjustment of the working speed of the engine of the tractor executing the task to be performed by the set.

* * * * *